United States Patent
Hurlen et al.

(10) Patent No.: US 10,259,537 B2
(45) Date of Patent: Apr. 16, 2019

(54) BRIDLE BLOCK FOR A DEFLECTOR

(71) Applicant: Mørenot Offshore AS, Søvik (NO)

(72) Inventors: Stig Hurlen, Brattvåg (NO); Terje Søvik, Søvik (NO)

(73) Assignee: Mørenot Offshore AS, Søvik (NO)

( * ) Notice: Subject to any disclaimer, the term of this patent is extended or adjusted under 35 U.S.C. 154(b) by 197 days.

(21) Appl. No.: 15/525,117

(22) PCT Filed: Nov. 12, 2015

(86) PCT No.: PCT/NO2015/050212
§ 371 (c)(1),
(2) Date: May 8, 2017

(87) PCT Pub. No.: WO2016/076731
PCT Pub. Date: May 19, 2016

(65) Prior Publication Data
US 2018/0273146 A1    Sep. 27, 2018

(30) Foreign Application Priority Data
Nov. 13, 2014   (NO) .................................. 20141361

(51) Int. Cl.
*B63B 21/66* (2006.01)
*A01K 73/04* (2006.01)
(Continued)

(52) U.S. Cl.
CPC .............. *B63B 21/66* (2013.01); *A01K 73/04* (2013.01); *A01K 73/045* (2013.01);
(Continued)

(58) Field of Classification Search
CPC .... G01V 1/3826; G01V 1/3817; B63B 21/66; B63B 2021/666; B63B 21/56
See application file for complete search history.

(56) References Cited

U.S. PATENT DOCUMENTS

| 7,658,161 B2 * | 2/2010 | Toennessen | A01K 73/05 114/246 |
| 7,881,153 B2 * | 2/2011 | Stokkeland | G01V 1/3826 367/18 |

(Continued)

FOREIGN PATENT DOCUMENTS

| GB | 2399883 | 9/2004 |
| NO | 331725 | 3/2012 |

(Continued)

OTHER PUBLICATIONS

International Search Report, PCT/NO2015/050212, dated Feb. 3, 2016.
Written Opinion, PCT/NO2015/050212, dated Feb. 3, 2016.

*Primary Examiner* — Andrew Polay
(74) *Attorney, Agent, or Firm* — Andrus Intellectual Property Law, LLP (57) ABSTRACT

A bridle block is for a deflector, and has a stem and a rocker arm attached to each other on a pivot axis. The stem has an attachment for a vessel towline, a forward portion of the rocker arm has an attachment for fore bridle lines of the deflector, and an aft portion of the rocker arm has an attachment for aft bridle lines of the deflector. A hydraulic cylinder has a valve, and is attached to the stem and the rocker arm to hold the stem and the rocker arm in a relative position. The valve is operated by a signal from a control unit. The valve takes an open position when a signal is missing, so there is an open fluid connection between a piston side of a piston and a reservoir or an open fluid connection between the piston-rod side of the piston and the reservoir.

14 Claims, 10 Drawing Sheets

(51) Int. Cl.
  *A01K 73/045* (2006.01)
  *B63G 8/42* (2006.01)
  *G01V 1/38* (2006.01)
(52) U.S. Cl.
  CPC ............. *B63B 2211/02* (2013.01); *B63G 8/42* (2013.01); *G01V 1/3817* (2013.01); *G01V 1/3826* (2013.01)

(56) References Cited

U.S. PATENT DOCUMENTS

| | | | |
|---|---|---|---|
| 8,752,493 B2 * | 6/2014 | Oxseth | B63B 21/66 114/253 |
| 2006/0176774 A1 | 8/2006 | Tonennessen | |
| 2012/0067265 A1 | 3/2012 | Valo | |

FOREIGN PATENT DOCUMENTS

| | | |
|---|---|---|
| RU | 743657 | 6/1980 |
| WO | 2012/070952 | 5/2012 |

* cited by examiner

BRIDLE BLOCK FOR A DEFLECTOR

FIELD

The invention relates to a bridle block for a deflector. More particularly, the invention relates to a bridle block for a deflector which is used in a seismic tow. The bridle block is arranged to allow easy adjustment of the angle of attack of the deflectors in the water. The invention also relates to a bridle block with a remote-controlled linear actuator. The invention also relates to a bridle block provided with means for the deflector to take a failsafe position. The invention also relates to a method of passively guiding the deflector into a failsafe position in which the deflector takes a known angle of attack relative to the water when the deflector is being towed through water.

BACKGROUND

In marine seismic it is common to carry out seismic surveys in which several long streamers and sources of seismic signals, usually airguns, are towed behind a vessel. The seismic signals, usually in the form of shock waves from the airguns, are reflected from layers in the underground and picked up by the streamers, after which the signals are interpreted, giving information on the geology of the underground. The streamers must be held apart so that they lie side by side in the longitudinal direction and have a certain spacing in the width direction. This is usually done with wing-shaped hydrofoils called deflectors or paravanes. Each deflector is usually attached to a towing block, called a "bridle block" in the trade, by straps at the forward and aft ends of the deflector. In the trade, the straps are referred to as "bridle lines" or "door bridles". Usually two or more bridle lines extend from the forward edge of the deflector to the bridle block, and two or more bridle lines from the aft edge of the deflector to the bridle block. The bridle block, in turn, is attached to the towline from the towing vessel. As a rule, the deflectors are placed on either side of the seismic tow and have such an angle of attack in the water that they pull the towlines and thereby the tow laterally outwards.

There is often a need to change the pull of the deflectors on the tow, and to control the direction of the tow. This may be done by adjusting the angle of attack of the deflector in the water. The angle of attack can be adjusted by replacing the bridle lines at the forward or aft edge of the deflector with shorter or longer bridle lines, while the rest of the bridle lines are kept unchanged. Another way of adjusting the angle of attack is to replace spacers, which include attachment points for the bridle lines in the bridle block, with shorter or longer spacers, whereas the bridle lines are typically kept in the same lengths.

The patent publication GB 2399883 relates to a deflector in which the angle of inclination may be varied to control how deep the deflector will move. A bridle block may be provided with an actuator or a hydraulic cylinder to change the angle of inclination of the deflector.

The Norwegian patent 331725 relates to a bridle block for a deflector including a main part or stem and a rocker arm which are pivotably attached to each other on a pivot axis, the stem having an attachment for a towline from a vessel, a forward portion of the rocker arm having an attachment for fore bridle lines of the deflector, and an aft portion of the rocker arm having an attachment for aft bridle lines of the deflector. A torque arm is connected to the forward portion of the rocker arm to apply a torque to the rocker arm. The torque arm is connected to a length-adjustable so-called "seventh bridle line" extending to the aft edge of the deflector, for the control of the deflector. The length-adjustment of the "seventh bridle line" is carried out with a linear actuator placed on the deflector. The linear actuator may be a hydraulic cylinder or winch. The linear actuator may be remote-controlled from a vessel towing the bridle block.

On a failure of the remote control of a deflector, for example on a power failure, it is desirable that the devices adjusting the bridle lines take a failsafe position in which the deflector is controlled into an angle of attack at which its pull on the tow is acceptable.

SUMMARY

The invention has for its object to produce a bridle block which is well suited for controlling a deflector. A special object is that the control of the deflector should be possible without the use of an extra "seventh bridle line". Another special object is that the bridle block should be well suited for remote-controlling the deflector. A further object is that, when it is remote-controlled and there is a failure of the remote control, the bridle block is to take a failsafe position in which it guides the deflector into an angle of attack at which its pull on the tow is acceptable. Yet another object is at least to provide a useful alternative to the prior art.

The object is achieved through the features which are specified in the description below and in the claims that follow.

In particular, the invention has application in connection with towing deflectors in a seismic tow in which the tow includes streamers which are kept spaced apart by the deflectors, by the deflectors pulling outer parts of the tow laterally outwards. However, the invention is not limited to this use only.

The invention is defined by the independent claim. The dependent claims define advantageous embodiments of the invention.

In a first aspect, the invention relates more specifically to a bridle block for a deflector. The bridle block includes a stem and a rocker arm pivotably attached to each other on a pivot axis, the stem having an attachment for a towline from a vessel, a forward portion of the rocker arm having an attachment for fore bridle lines of the deflector, and an aft portion of the rocker arm having an attachment for aft bridle lines of the deflector, and the bridle block further includes a hydraulic cylinder provided with at least one valve. The hydraulic cylinder is attached to the stem and the rocker arm to hold the stem and the rocker arm in a chosen relative position. The invention is characterized by the at least one valve being operated by a direct or indirect electric control signal from a control unit, and by the at least one valve taking an open position when a control signal is missing, so that an open fluid connection is formed between the piston side of a piston and a reservoir for hydraulic oil, or so that an open fluid connection is formed between the piston-rod side of the piston and the reservoir for the hydraulic oil.

Because of the design of the deflector, the fore bridle lines will constantly be pulling on the forward portion of the rocker arm. This exerts a constant force on the piston rod of the hydraulic cylinder. Depending on how the hydraulic cylinder has been attached to the stem and to the rocker arm, the deflector will either pull the piston with the piston rod outwards in the housing of the hydraulic cylinder or push the piston with the piston rod inwards in the housing. It is therefore possible that the hydraulic cylinder may be provided with just one valve which directs the flow of hydraulic oil to that side of the piston which is necessary to counteract either the pull from the deflector or the push from the deflector. Hydraulic oil on the opposite side of the piston is thus passively vented by being driven out of the housing or by being sucked into the housing by the movements of the piston. It may still be desirable that the hydraulic cylinder should be provided with two valves, wherein one valve will control the flow of hydraulic oil to the piston side of the piston and the other valve will control the flow of hydraulic oil to the piston-rod side of the piston. It is then achieved that the bridle block takes a desired position more quickly than what is achieved when the pull from the deflector decides the displacement of the piston in one direction.

The hydraulic cylinder may be attached to the stem and the rocker arm in the forward portion of the rocker arm. Alternatively, the hydraulic cylinder may be attached to the stem and the rocker arm at the aft portion of the rocker arm.

The valve may be a hydraulic valve which is operated by a hydraulic pressure or a negative hydraulic pressure. The valve may also be an electrically operated valve. The valve may also be an electro-hydraulic valve which is opened by means of hydraulic pressure/negative pressure and which is closed by means of electric control signals, possibly also by means of electrical current. The valve may also be an electro-hydraulic valve which is opened by means of electric control signals, possibly also by means of electrical current, and which is closed by means of hydraulic pressure/negative pressure. The valve may also be an electro-hydraulic valve which is opened either by means of hydraulic pressure/negative pressure or by means of electric control signals, possibly also by means of electrical current, and which is closed either by means of hydraulic pressure/negative pressure or by means of electric control signals, possibly also by means of electrical current. Such hydraulic and electro-hydraulic valves are known and are not described any further. When two valves are used, the valves may be identical. Any combination of valves may be used as well. A hydraulic valve is operated indirectly by means of an electric signal from the control unit. The control signal regulates a pump which controls the pressure/negative pressure of the hydraulic oil on the control side of the valve. An electrically operated valve is operated directly. An electro-hydraulic valve is operated by a combination of indirect and direct electric control.

The piston may be displaced all the way into the housing of the hydraulic cylinder when the at least one valve is open. Alternatively, the piston may be pulled all the way out in the housing of the hydraulic cylinder when the at least one valve is open.

The piston may be displaced all the way into the housing of the hydraulic cylinder when both valves are open. Alternatively, the piston may be pulled all the way out in the housing of the hydraulic cylinder when both valves are open. When both valves are open, both an open fluid connection between the piston side of a piston and a reservoir for hydraulic oil and an open fluid connection between the piston-rod side of the piston and the reservoir for the hydraulic oil may be formed.

The reservoir for hydraulic oil, a hydraulic pump and a motor for the hydraulic pump may be positioned on the bridle block. The reservoir for hydraulic oil, a hydraulic pump and a motor for the hydraulic pump may be positioned on the deflector. Necessary hydraulic hoses may be extended between the deflector and the bridle block along one or more of the fore bridle lines or the aft bridle lines.

The rocker arm may have an inward portion for the attachment of the hydraulic cylinder.

The position of the piston rod may be controlled via a remote control.

In a second aspect, the invention relates to a method of passively guiding a deflector into a known angle of attack relative to water when the deflector is being towed through the water, wherein the deflector is attached to a bridle block with fore bridle lines and aft bridle lines. The method is characterized by the bridle block consisting of a bridle block as described above, and by direct or indirect electric control signals from the control unit to the at least one valve ceasing. The known angle of attack relative to the water is the failsafe position of the deflector.

The electric control signal from the control unit may cease when electrical energy from the electric power unit ceases. This may happen, for example, on a rupture of an electric line from the deflector where the electric power unit is positioned to the bridle block, on a short-circuiting of the electric power unit, or on a discharging of the electric power unit. The electric power unit may be a battery.

The electric control signal from the control unit may cease when the control unit does not have communication with a vessel. The communication may take place through a cable from the vessel to the bridle block. The communication may be a wireless communication like a radio connection.

The electric control signal from the control unit may cease when a pressure sensor for the hydraulic oil in a hydraulic system registers that the pressure in the hydraulic oil is lower than a predefined value. This may be a warning that there is a leakage in the hydraulic system.

The electric control signal from the control unit may cease when the control unit receives a signal from a vessel to let the direct or indirect electric signal to the at least one valve cease. This may be if personnel on the vessel discover an unexpected or undesired situation and it becomes necessary to let one of the deflectors or both deflectors take a failsafe position. The signal from the vessel is thus triggered manually. The signal may be transmitted via a cable or via a radio connection.

BRIEF DESCRIPTION OF THE DRAWINGS

In what follows, examples of preferred embodiments are described, which are visualized in the accompanying drawings, in which.

DETAILED DESCRIPTION OF THE DRAWINGS

The invention will now be explained in connection with the towing of deflectors in a seismic tow. The tow includes streamers which are kept spaced apart by the deflectors, by the deflectors pulling the tow outwards and providing sufficient separation.

The same reference numeral is used for corresponding parts in all the figures.

Figure 1:
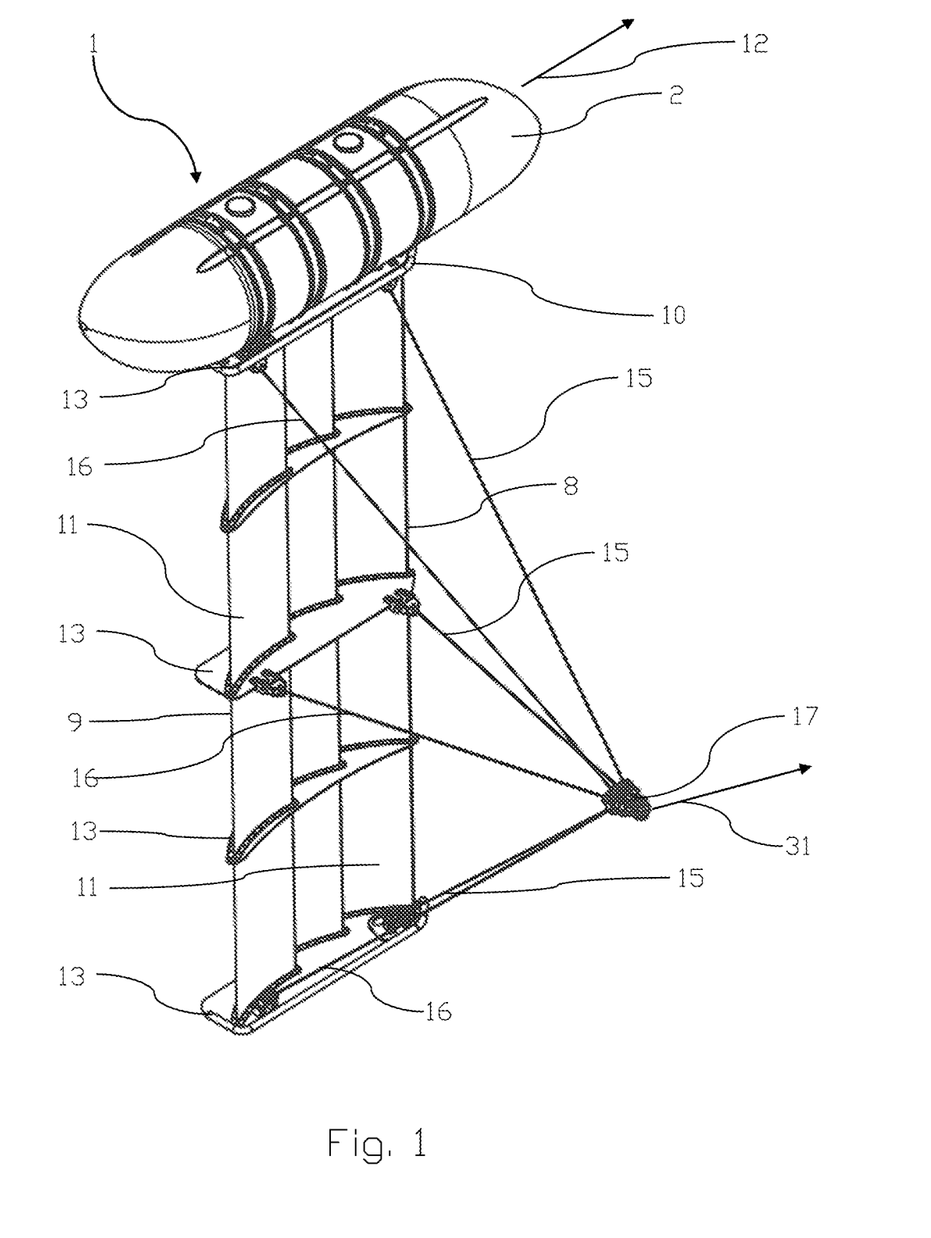
FIG. 1 shows a perspective view of a known deflector attached with bridle lines to a prior-art bridle block.

FIG. 1 shows a known deflector 1 including arched wings or foils 11 which, in the position of application, stand vertically in the water. The wings 11 are held fixed by braces 13 which, in the position of application, are substantially perpendicular to the wings 11 and horizontal in the water. In its upper portion 10, the deflector 1 is provided with a float or a pontoon 2. In FIG. 1, three fore bridle lines 15 are shown, which are each attached to a respective brace 13 at the forward edge 8 of the deflector 1 and extend to a bridle block 17. Correspondingly, three aft bridle lines 16 are shown, which are each attached to a respective brace 13 at the aft edge 9 of the deflector and extend to the bridle block 17. Depending on the size and pull of the deflector 1, the numbers of foils 11, braces 13, fore bridle lines 15 and aft bridle lines 16 may be different from those shown in FIG. 1.

Figures 2A, 2B:
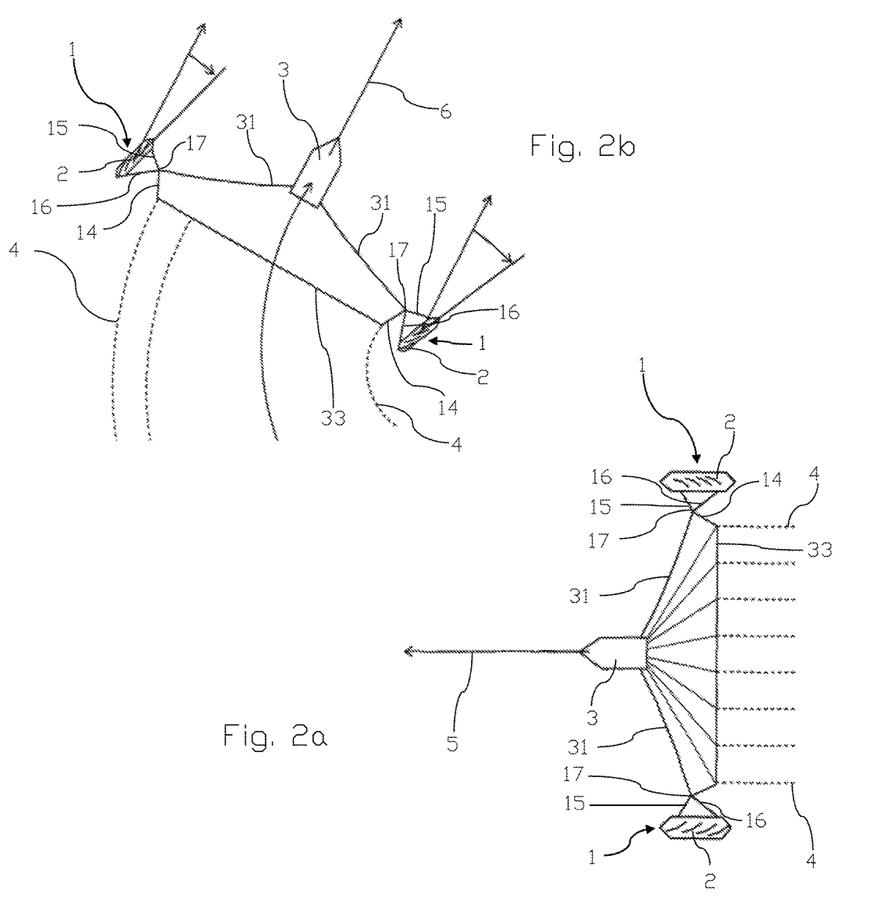
FIGS. 2a-b show sketches, on a smaller scale, of a prior-art seismic tow viewed from above.

FIGS. 2a and 2b show a vessel 3 towing streamers 4 according to the prior art. FIG. 2a shows the vessel 3 on a course straight ahead in the direction 5, whereas FIG. 2b shows the vessel 3 during a change of course into a direction 6. Port and starboard towlines 31 extend from the vessel 3 to respective bridle blocks 17; see FIG. 1. A deflector 1 is attached to the bridle block 17 with fore bridle lines 15 and aft bridle lines 16. The streamers 4 extend astern of the vessel 3 to a front line 33, where they are secured, and further side by side astern of the front line 33. A so-called spur line 14 connects the bridle block 17 to the front line 33. The spur line 14 may extend from the bridle block 17 to the outermost portion of the front line 33 where the outermost streamer 4 is attached as well, as is shown in FIGS. 2a, 2b.

The lengths of the fore bridle lines 15 and the aft bridle lines 16 are adapted for the longitudinal direction 12 of the deflector 1 to point obliquely outwards from the tow. The obliqueness of the deflector 1, that is to say its angle of attack in the water, and the wing profile of the deflector 1, cause the deflector 1 to pull outwards on the bridle lines 15, 16 which, in turn, pull on the bridle block 17. The pull propagates on to the spur line 14 and the front line 33.

For the performance of the seismic survey and to prevent the streamers 4 from tangling up, it is highly desirable that the streamers 4 should maintain their mutual spacing at all times, or, in other words, that the front line 33 should be extended. To ensure that the front line 33 is extended, the angles of attack of the deflectors 1 in the water must be so large that the deflectors 1 pull sufficiently outwards. However, the angles of attack must not be so large that the deflectors 1 cause unduly large resistance to motion in the tow. The setting of the deflectors 1 can be done by the choice of spacers (not shown) for the attachment of the fore and aft bridle lines 15, 16 to the bridle block 17, or by the choice of lengths of the fore and aft bridle lines 15, 16.

When the attachment for the fore bridle lines 15 on the bridle block 17 is moved towards the deflector 1 by spacers for the attachment of the bridle lines 15 being replaced, or when the fore bridle lines 15 are made longer in relation to the aft bridle lines 16, the forward edge 8 of the deflector 1 will have a larger distance from the bridle block 17, the angle of attack of the deflector 1 in the water will increase, and the pull of the deflector 1 on the bridle lines 15, 16 will increase. Correspondingly, when the attachment for the fore bridle lines 15 on the bridle block 17 are moved away from the deflector 1 by replacing spacers for the attachment of the bridle lines 15 in the bridle block 17, or when the fore bridle lines 15 are made shorter in relation to the aft bridle lines 16, the forward edge 8 of the deflector 1 will be kept closer to the bridle block 17, the angle of attack of the deflector 1 in the water will decrease, and the pull of the deflector 1 on the bridle lines 15, 16 will decrease. Corresponding considerations apply to the replacement of spacers for attaching the aft bridle lines 16 or changing the lengths of the aft bridle lines 16.

The deflectors 1 may be set before they are deployed into the sea, and the setting may then be done manually.

When the course of the vessel 3 is straight ahead in the direction 5, as shown in FIG. 2a, it is desirable that the deflectors 1 should move straight ahead. However, wind, waves and currents may pull the tow sideways and to counter this it may be desirable that one of the deflectors 1 should pull outwards more than the other deflector 1. It may then be desirable to control the angles of attack of the deflectors 1 in the water. The need to control the angles of attack of the deflectors 1 will normally change while the deflectors 1 are in the water and it is therefore desirable that the control should be a remote control.

When the vessel 3 changes its course and goes in the direction 6, as shown in FIG. 2b, it is desirable, in order to keep the front line 33 extended, that the inner deflector 1 pulls outwards more than the outer deflector 1, consequently having a larger angle of attack in the water, as shown. Since the need for this control is when the deflector is in the water, it is also desirable in this case that the control should be a remote control.

Figure 2C:
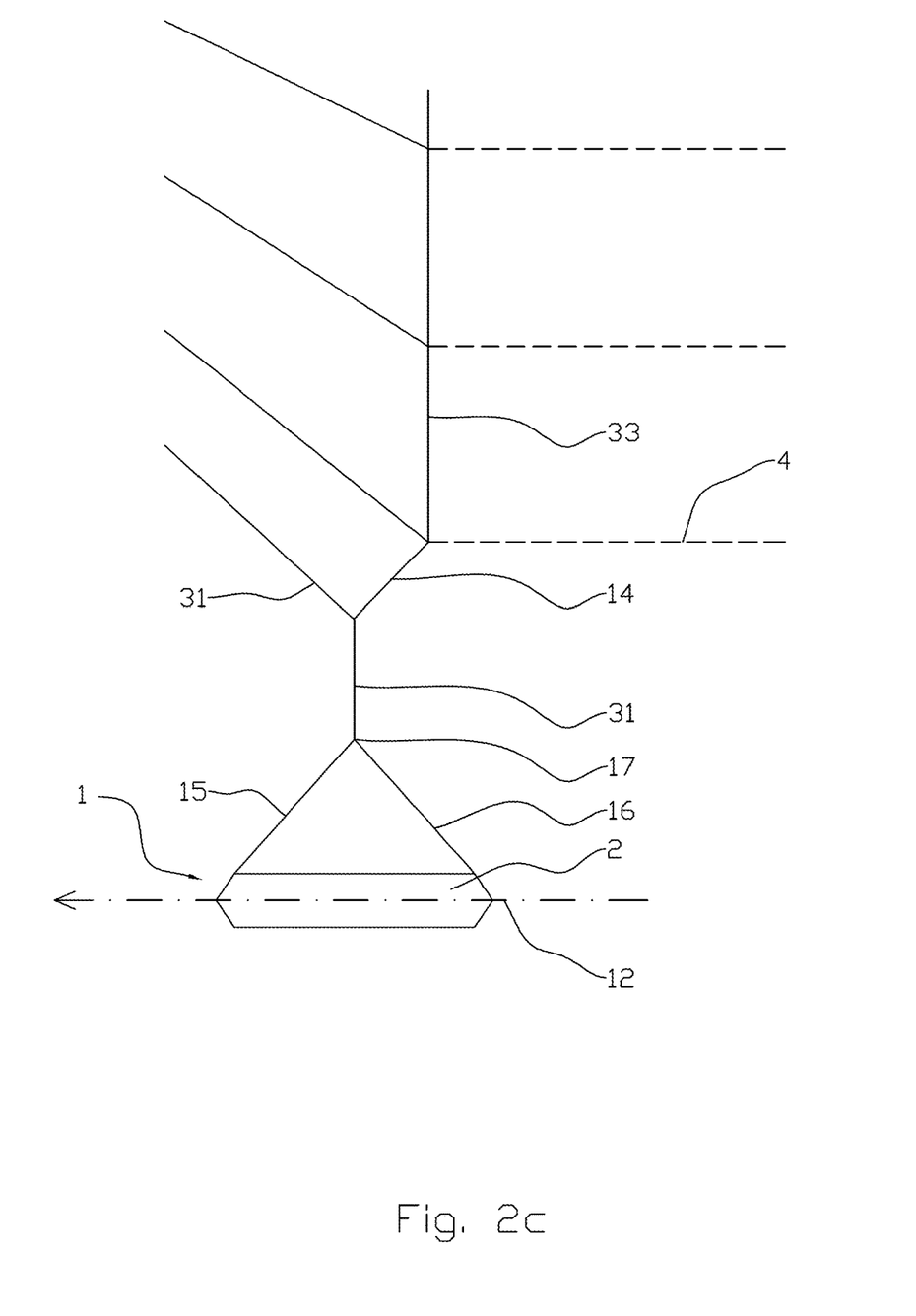
FIG. 2c show a detail in an S-tow, on a larger scale.

FIG. 2c shows a variant of a seismic tow which is characterized as an S-tow by the applicant. In the S-tow, the spur line 14 is not attached to the bridle block 17, but is instead attached to the towline 31 at a distance from the bridle block 17.

The bridle block 17 according to the invention is shown in FIGS. 3 to 8 and is described in what follows.

Figure 3:
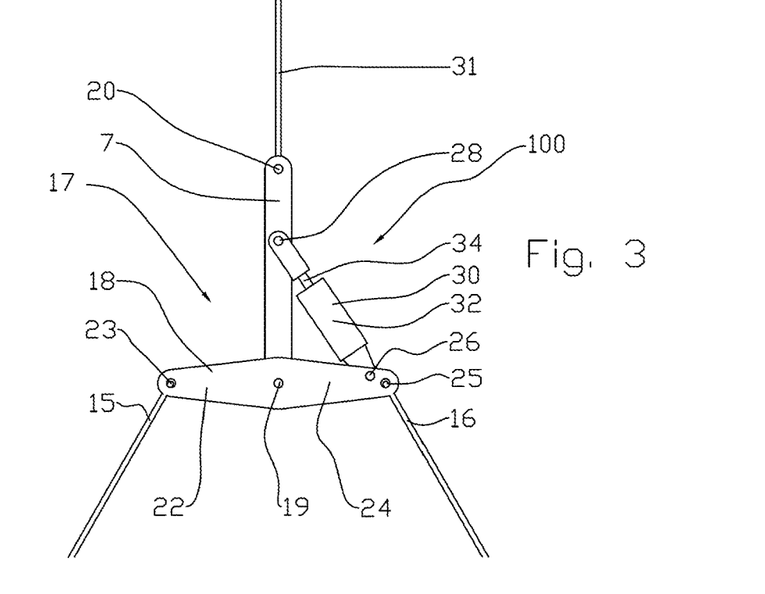
FIG. 3 show a first embodiment of a bridle block according to the invention, on a different scale.
Figure 6:
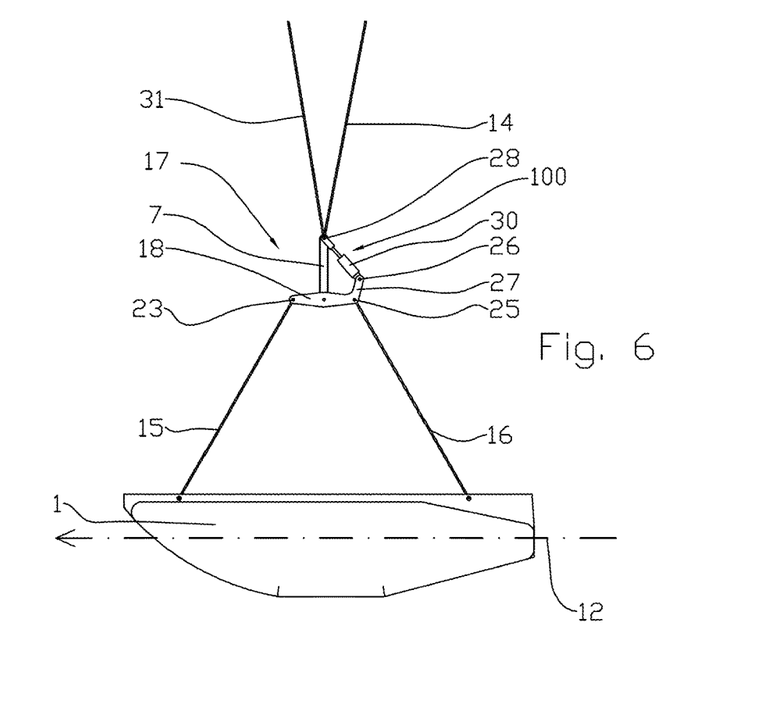
FIG. 6 shows a bridle block according to the invention attached to a front line and a spur line, on a smaller scale.

FIG. 3 shows a bridle block 17 for a deflector 1, including a stem 7 and a rocker arm 18 which are pivotably attached to each other on a pivot axis 17, where there may be a bush with a through bolt. The stem 7 has an attachment 20 for a towline 31 from a vessel 3. If the bridle block 17 is used in an S-tow, as explained with reference to FIG. 2c, only the towline 31 is attached to the bridle block 17. If a tow as described with reference to FIGS. 2a and b is used, there is also a spur line 14 as shown in FIG. 6 attached to the bridle block 17. The bridle block 17 according to the invention may be used in both types of tow.

A forward portion 22 of the rocker arm 18 has an attachment 23 for fore bridle lines 15 of the deflector 1, and an aft portion 24 of the rocker arm 18 has an attachment 25 for aft bridle lines 16 of the deflector 1. The attachments 20, 23, 25 are of types known in seismic.

What is new and characteristic of the invention is that the bridle block 17 includes a holding device 100 attached to the stem 7 and the rocker arm 18 to hold the stem 7 and the rocker arm 18 in a chosen relative position. The attachments 23, 25 for the fore and aft bridle lines 15, 16, respectively, will have positions relative to the vessel 3 depending on the relative position of the stem 7 and the rocker arm 18. When there is a change in the relative position of the stem 7 and the rocker arm 18, the positions of the attachments 23, 25 for the bridle lines 15, 16 will change correspondingly.

Figure 4:
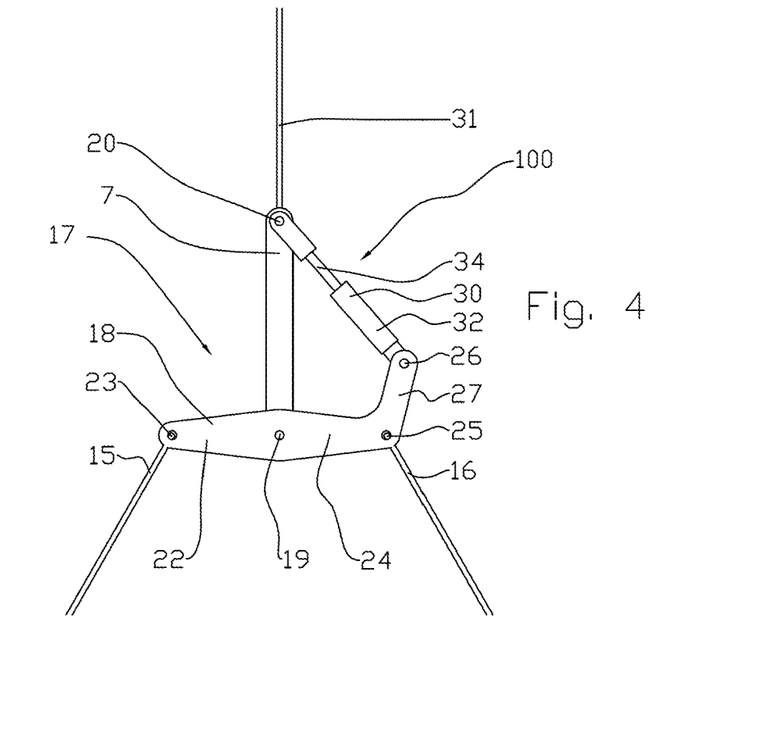
FIG. 4 shows a second embodiment of a bridle clock according to the invention, on the same scale as FIG. 3.

FIG. 4 shows an embodiment of the bridle block 17 in which the aft portion 24 of the rocker arm 18 has an inward portion 27 for the attachment of the holding device 100.

Structurally, the holding device 100, the portion of the stem 7 which is between the pivot axis 19 and the attachment of the holding device 100 to the stem 7, and the portion of the rocker arm 18 which is between the pivot axis 19 and the attachment of the holding device 100 to the rocker arm 18 form a triangle. The triangle is a rigid structure, holding the stem 7 and the rocker arm 18 fixed in their relative position. A change in the length of the holding device 100 changes the relative position of the stem 7 and the rocker arm 18, and consequently also changes the positions of the attachments 23, 25 for the bridle lines 15, 16 relative to the vessel 3 and the tow.

Figure 5:
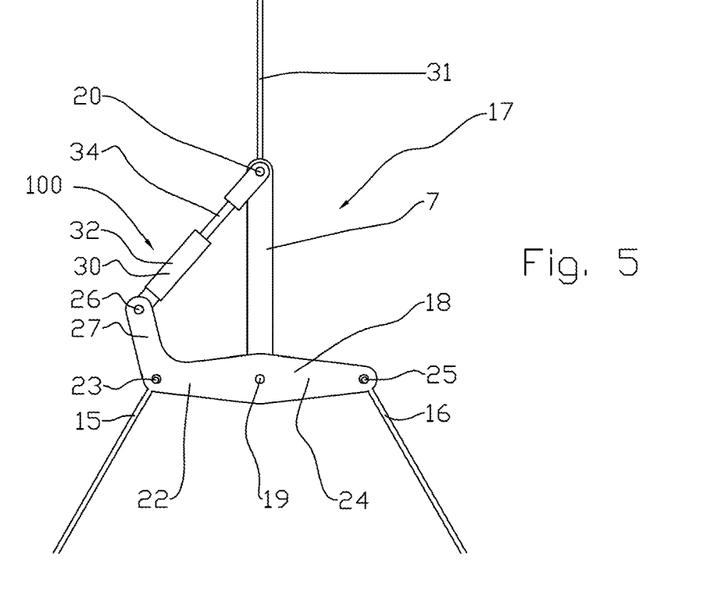
FIG. 5 shows a third embodiment of a bridle block according to the invention, on the same scale as FIG. 3.
Figure 7A:
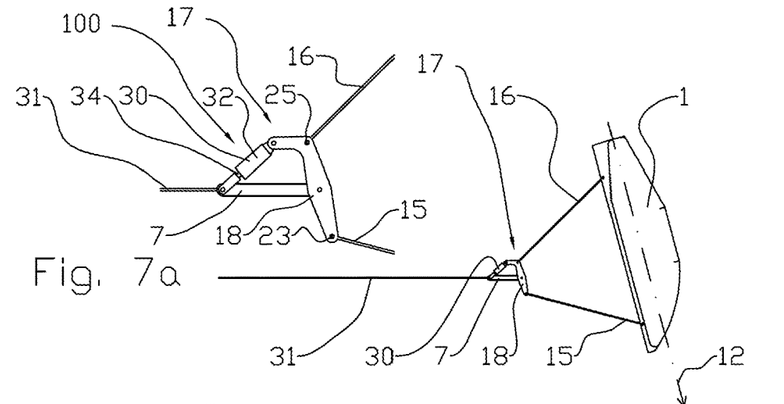
FIGS. 7a-c show the bridle block shown in FIG. 6 on a larger scale than in FIG. 6 with different lengths of a holding device, and a section on a larger scale.
Figure 7B:
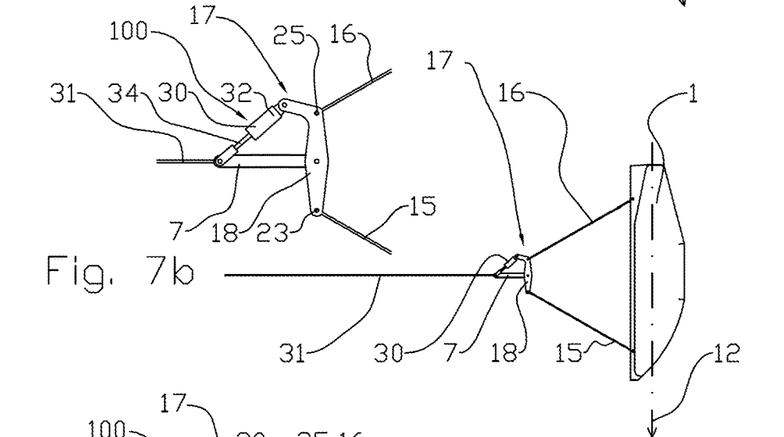
Figure 7C:
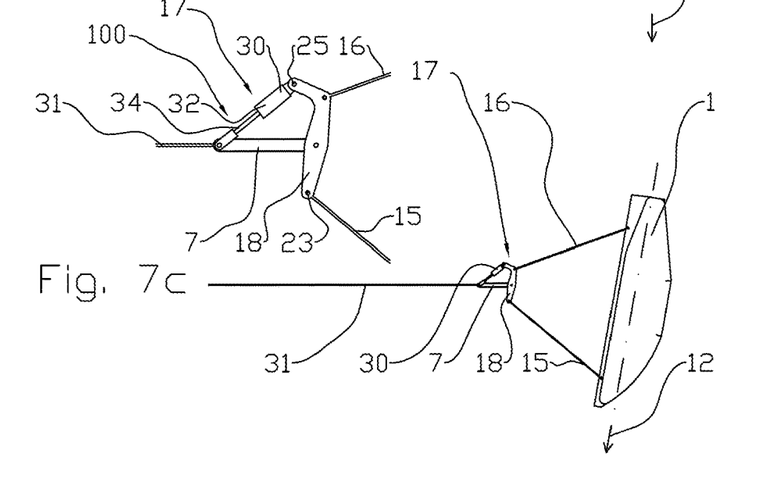

When the holding device 100 in FIGS. 3 and 4 is made shorter, the rocker arm 18 is pivoted around the stem 7 on the pivot axis 19. The attachment 25 for the aft bridle lines 16 is moved towards the vessel 3, whereas the attachment 23 for the fore bridle lines 15 is moved away from the vessel 3. The aft edge 9 of the deflector 1 is thereby kept closer to the vessel 3, whereas the forward edge 8 will have a larger distance to the vessel 3. The deflector 1 will thereby have a larger angle of attack in the water and be pulling more on the bridle lines 15, 16. Correspondingly, if the holding device 100 in FIGS. 3 and 4 is made longer, the attachment 25 for the aft bridle lines 16 is moved away from the vessel 3, whereas the attachment 23 for the fore bridle lines 15 is moved towards the vessel 3. The forward edge 8 of the deflector 1 is thereby kept closer to the vessel 3, whereas the aft edge 9 of the deflector 1 will have a larger distance to the vessel 3. The deflector 1 will thereby have a smaller angle of attack in the water and be pulling less on the bridle lines 15, 16. This is also shown in FIGS. 7a-7c. FIG. 5 shows an alternative embodiment of the bridle block 17 in which the forward portion 22 of the rocker arm 18 has an inward portion 27 for the attachment of the holding device 100. The embodiment shown in FIG. 5 works in the same way as the embodiment shown in FIGS. 3 and 4, but with the difference that when the holding device 100 is made shorter, the forward edge 8 of the deflector 1 will have a smaller distance to the vessel 3. The deflector 1 will thereby have a smaller angle of attack in the water and be pulling less on the bridle lines 15, 16. Correspondingly, if the holding device 100 is made longer, the attachment 25 for the aft bridle lines 16 is moved towards the vessel 3, whereas the attachment 23 for the fore bridle lines 15 is moved away from the vessel 3. The forward edge 8 of the deflector 1 will thereby be kept further away from the vessel 3, whereas the aft edge 9 of the deflector 1 will have a smaller distance to the vessel 3. The deflector 1 will thereby have a larger angle of attack in the water and be pulling more on the bridle lines 15, 16.

FIGS. 3-8 show examples of a bridle block 17 with a length-adjustable holding device 100 in the form of a hydraulic cylinder 30. The hydraulic cylinder 30 includes a housing 32 and a piston rod 34.

The adjustment of the holding device 100 and, accordingly, the control of the deflector 1 happen via a remote-controlled control unit 99. The control unit 99 may have a cabled connection to the vessel 3, or the control unit may communicate in a wireless manner with the vessel 3, for example in connection with a GPS-based positioning system. The control unit 99 controls a hydraulic aggregate 50 and the hydraulic cylinder 30. The control unit 99 may be supplied with energy from an energy source 40, typically an electric battery 40, which may be on the bridle block 17 or on the deflector 1. It is advantageous that the energy source 40 is positioned on the deflector 1 as this allows the use of an energy source 40 of large capacity. The energy source 40 may supply the energy directly to an electrically operated holding device 100 or indirectly, for example via a hydraulic aggregate 50. The hydraulic aggregate 50 comprises a reservoir 51, a motor 53 and a pump 55 driven by the motor 53. If the energy source 40 is on the deflector 1, the energy may be transmitted as electrical energy on an electrical cable along one of the bridle lines 15, 16. In one embodiment, the hydraulic aggregate 50 may be positioned on the deflector 1. In this embodiment, hydraulic energy is transferred in hydraulic hoses (not shown) from the deflector 1 to the hydraulic cylinder 30 on the bridle block 17. In another embodiment, the hydraulic aggregate 50 may be positioned on the bridle block 17. This has the advantage of there being no hydraulic hoses between the deflector 1 and the bridle block 17. Such hoses increase the risk of leakage of hydraulic oil 58 from the hydraulic system 59 which includes the hydraulic aggregate 50, hydraulic hoses, hydraulic cylinder 30 and valves 35, 36. The hydraulic system 59 also includes a pressure sensor 56 for measuring the pressure of a hydraulic oil 58 in the hydraulic system 59.

In one embodiment, the attachment 26 of the hydraulic cylinder 30 to the aft portion 24 of the rocker arm 18 is near to the attachment 25 for aft bridle lines 16, as shown in FIG. 3. The hydraulic cylinder 30 is attached to the stem 7 in an attachment 28 at a distance from the attachment 20 for the towline 31, as in the embodiments shown in FIGS. 3-8.

Figure 9A:
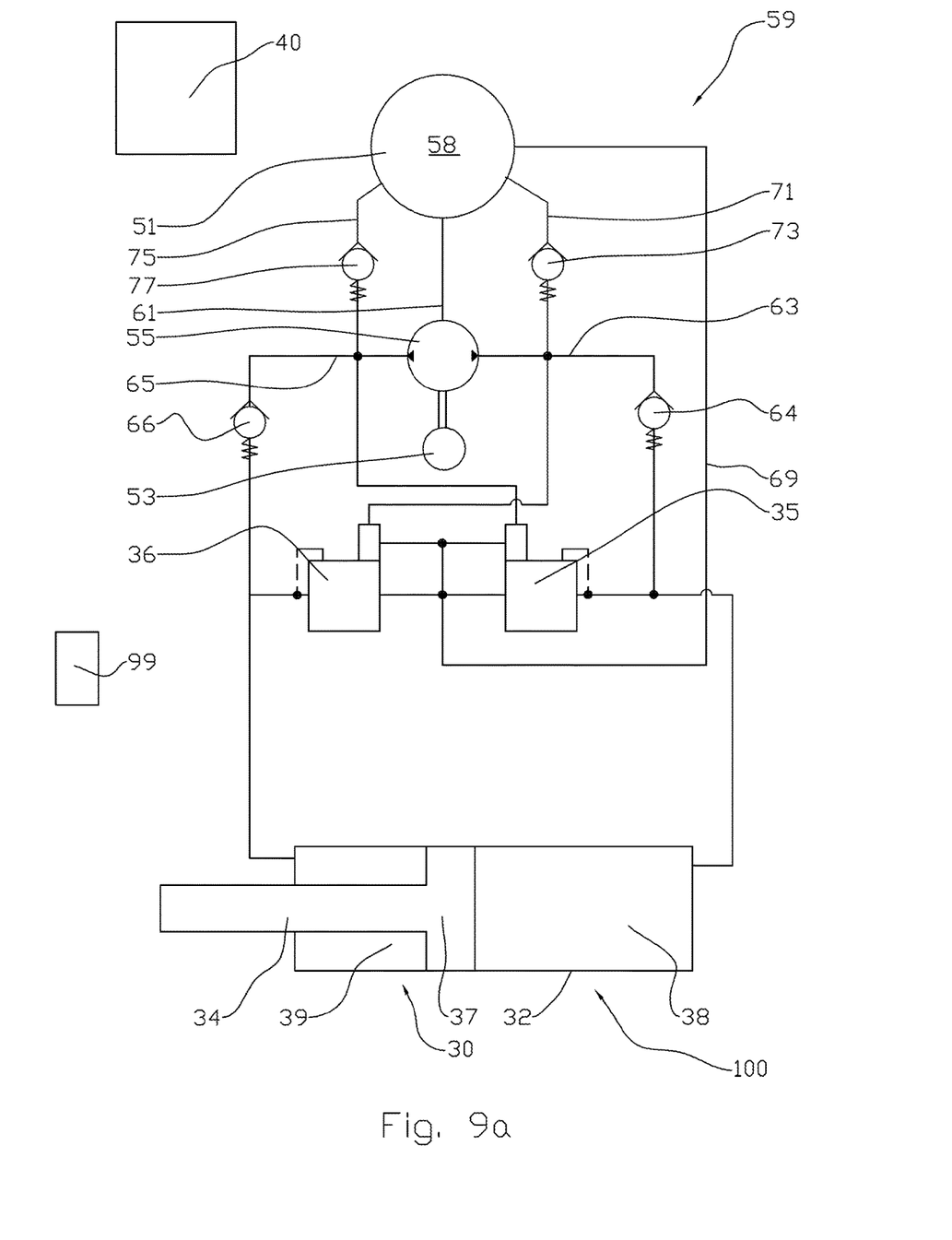
FIGS. 9a-c show schematically an energy source, a hydraulic system and a control unit where a holding device is shown in three different positions.
Figure 9B:
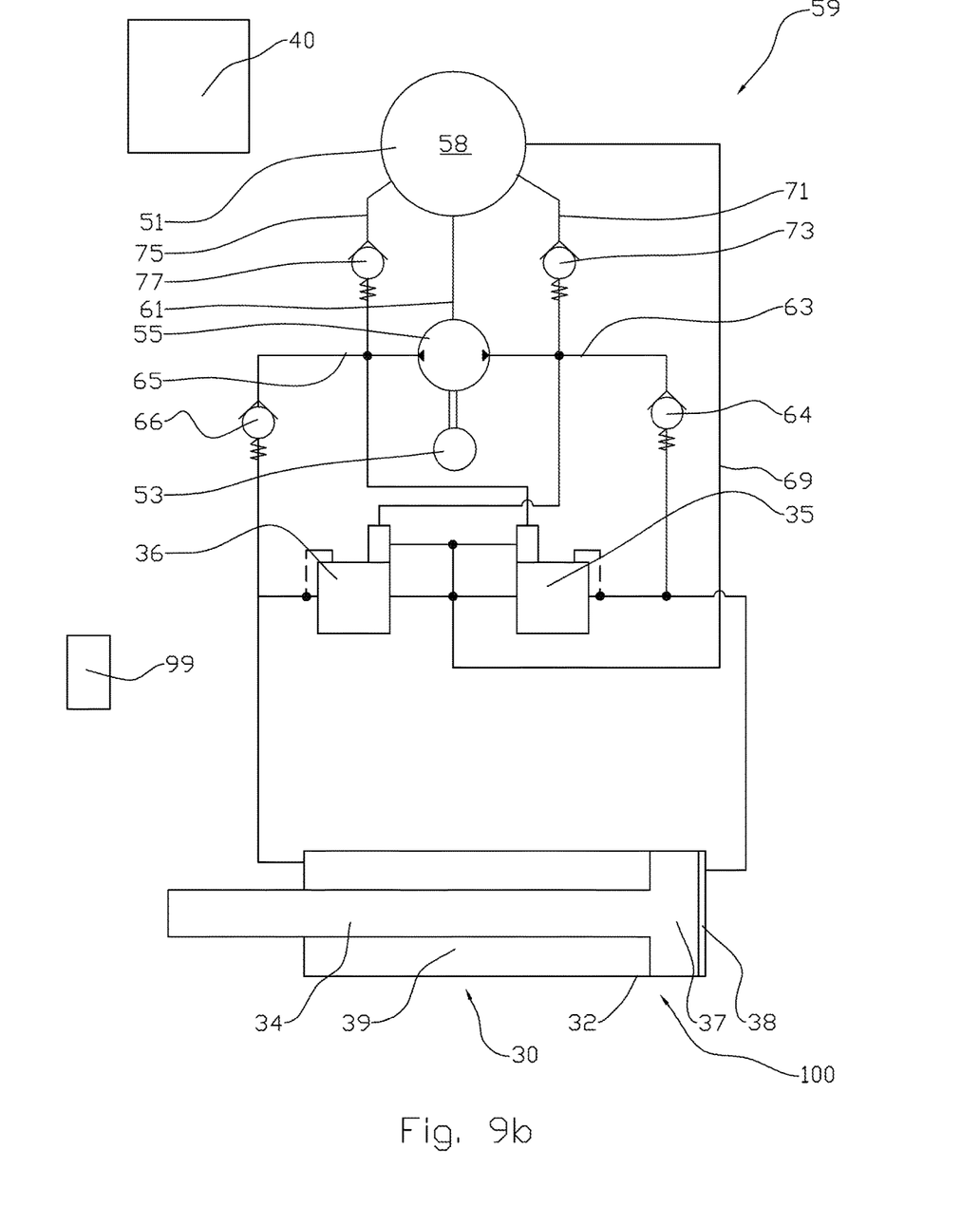
Figure 9C:
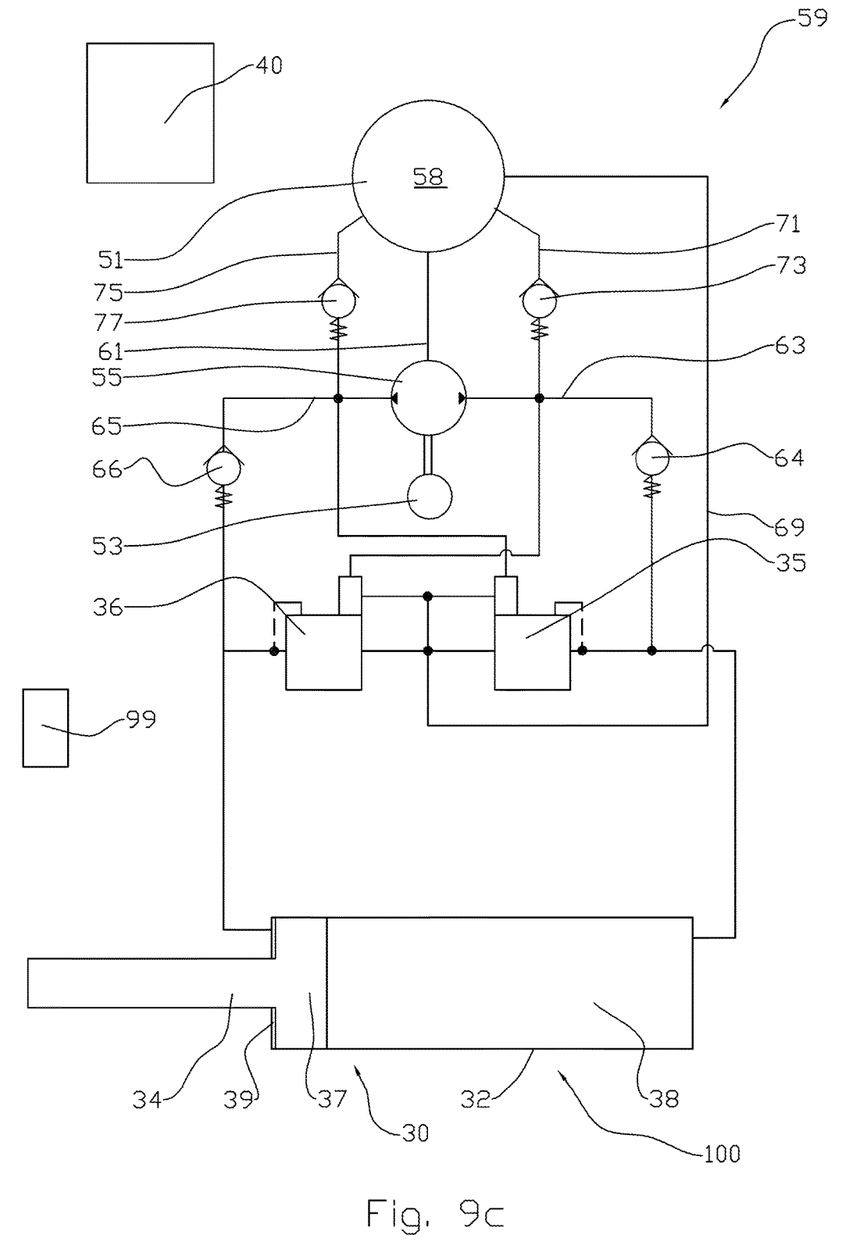

The energy source 40 is shown in FIGS. 9a-9c.

FIG. 6 shows the bridle block 17 with a towline 31 and a spur line 14.

FIGS. 7a-c show how the deflector 1 places itself relative to the bridle block 17 when the linear actuator 30 in the form of a hydraulic cylinder 30 is activated into taking a short length (FIG. 7a), a medium length (FIG. 7b) and a long length (FIG. 7c). The bridle block 17 is the same as that shown in FIG. 4, but without a spur line 14. The effect of the different lengths is the same as that described earlier for FIGS. 3 and 4.

Figure 8:
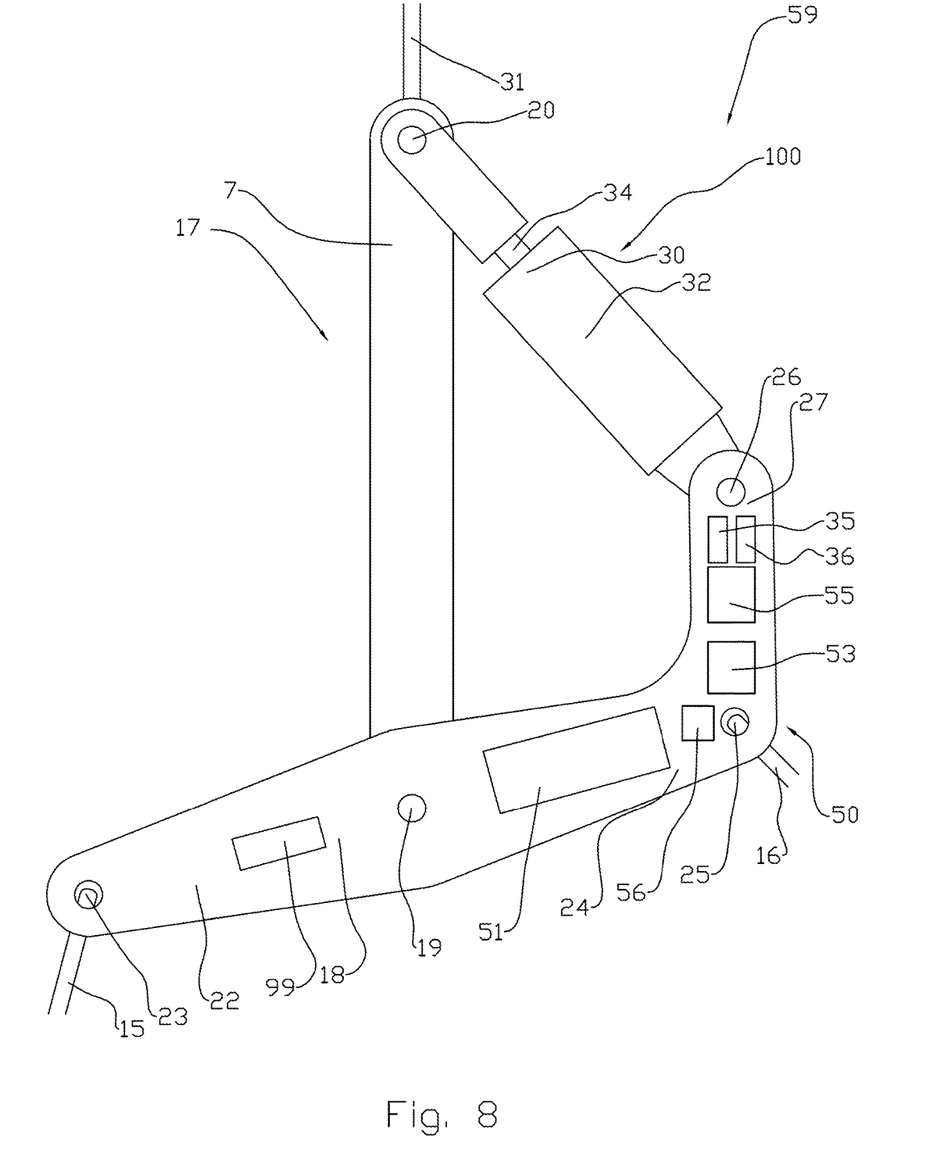
FIG. 8 shows schematically a bridle block provided with a hydraulic system and a control unit, on a larger scale.

FIG. 8 shows the bridle block 17 in an embodiment in which the hydraulic aggregate 50 is positioned on the bridle block 17. The control unit 99 is positioned on the bridle block 17 as well. The bridle block 17 is further provided with a motor 53 and a pressure sensor 56. Necessary hydraulic connections between the reservoir 51 and the pump 55 are not shown in FIG. 8. This also applies to necessary hydraulic connections between the pump 55 and the valves 35, 36, and necessary connections between the control unit 99 and the hydraulic system 59.

FIGS. 9a-9c schematically show a possible hydraulic system 59 according to the invention. The hydraulic system 59 receives energy from the energy source 40. The energy source 40 may consist of a battery 40. The energy source 40 may be positioned on the deflector 1 or on the bridle block 17. The hydraulic system 59 includes the control unit 99. The control unit 99 may be positioned on the deflector 1 or on the bridle block 17. The hydraulic system includes the hydraulic aggregate 50 which comprises the reservoir 51, the motor 53 and the pump 55. The reservoir 51 contains the hydraulic oil 58. The hydraulic system 59 further includes the holding device 100 in the form of the hydraulic cylinder 30. The hydraulic cylinder 30 includes a housing 32 and a piston 37 attached to the piston rod 34. The piston 37 can be displaced in the housing 32. The piston 37 forms a piston side 38 and a piston-rod side 39.

The motor 53 is controlled from the control unit 99. The motor 53 is arranged to rotate in two directions. The pump 55 is driven by the motor 53 and is provided with an inlet 61 from the reservoir 51. The pump 55 has a first outlet 63 and a second outlet 65. The first outlet 63 is in fluid communication with the piston side 38 of the hydraulic cylinder 30 via a one-way valve 64. The second outlet 65 is in fluid communication with the piston-rod side 39 of the hydraulic cylinder 30 via a one-way valve 66. When the motor 53 rotates in a first direction, hydraulic oil 58 flows from the reservoir 51 through the pump 55, through the one-way valve 64 to the piston side 38. The piston 37 is thereby displaced outwards in the housing 32. The valve 35 is closed so that hydraulic oil 58 cannot flow through the valve 35. The hydraulic oil 58 on the piston-rod side 39 flows from the housing 32, through the open valve 36 to the reservoir 51 through a return line 69. The hydraulic cylinder 30 is provided with a position indicator (not shown) which gives a signal to the control unit 99 about the position of the piston 37. The motor 53 is stopped when the piston 37 is in the desired position. When the motor 53 rotates in a second direction, hydraulic oil 58 flows from the reservoir 51 through the pump 55, through the one-way valve 66 to the piston-rod side 39. The piston 37 is thereby displaced inwards in the housing 32. The valve 36 is closed so that hydraulic oil 58 cannot flow through the valve 36. The hydraulic oil 58 on the piston side 38 flows from the housing 32, through the open valve 35 and into the reservoir 51 through the return line 69. The hydraulic cylinder 30 is provided with a position indicator (not shown) which gives a signal to the control unit 99 on the position of the piston 37. The motor 53 is stopped when the piston 37 is in the desired position.

The opening and closing of the valves 35 and 36 are controlled by electric control signals from the control unit 99. When an electric control signal from the control unit 99 is missing, the valves 35 and 36 are opened. The piston 37 in the hydraulic cylinder 30 will then be displaced either all the way into the housing 32, as shown in FIG. 9b, or all the way out in the housing 32, as shown in FIG. 9c. The displacement of the piston 37 happens by the deflector 1 tending outwards at its forward edge 8, pulling on the fore bridle lines 15. The positioning of the holding device 100 on the bridle block 17 decides whether the pull from the bridle lines 15 will push the piston 37 all the way in or whether the pull from the bridle lines 15 will pull the piston 37 all the way out. With the position shown in FIG. 4, the piston 37 will be pushed all the way in as shown in FIG. 9b. With the position shown in FIG. 5, the piston 37 will be pulled all the way out as shown in FIG. 9c. As the piston 37 cannot be moved beyond these extreme positions, the extreme position of the piston 37 will determine the largest angle of attack of the deflector 1 in the water, and this constitutes a predetermined failsafe angle of attack.

When the piston 37 is being displaced all the way out, the hydraulic oil 58 will flow from the piston-rod side 39 through the open valve 36, through the return line 69 and into the reservoir 51. Hydraulic oil 58 flows into the housing 32 from the reservoir 51, through a supply line 71, through a one-way valve 73 into a connection to the first outlet 63 and to the piston side 38. There is also fluid communication between the valves 35 and 36, so that some hydraulic oil 58 may flow from the valve 36 to the valve 35 and from there on to the piston side 38. When the piston 37 is being moved all the way in, the hydraulic oil 58 will flow from the piston side 38 through the open valve 35, through the return line 69 and to the reservoir 51. Hydraulic oil 58 flows into the housing 32 from the reservoir 51, through a supply line 75, through a one-way valve 77 and into a connection to the second outlet 65 and to the piston-rod side 39. Some hydraulic oil 58 may flow through the fluid communication between the valve 36 and the valve 35 and from there on to the piston-rod side 39.

It should be noted that all the above-mentioned embodiments illustrate the invention, but do not limit it, and the person skilled in the art may construct many alternative embodiments without departing from the scope of the dependent claims. In the claims, reference numbers in brackets are not to be regarded as restrictive. The use of the verb "to comprise" and its different forms does not exclude the presence of elements or steps that are not mentioned in the claims. The indefinite article "a" or "an" before an element does not exclude the presence of several such elements. The fact that some features are specified in mutually different dependent claims does not indicate that a combination of these features cannot be used with advantage.

The invention claimed is:

1. A bridle block for a deflector, the bridle block comprising a stem and a rocker arm pivotably attached to each other on a pivot axis, the stem having an attachment for a towline from a vessel, a forward portion of the rocker arm having an attachment for fore bridle lines of the deflector, and an aft portion of the rocker arm having an attachment for aft bridle lines of the deflector, and the bridle block having a hydraulic cylinder provided with at least one valve, and the hydraulic cylinder being attached to the stem and the rocker arm to hold the stem and the rocker arm in a chosen relative position, wherein the at least one valve is operated directly or indirectly by an electric control signal from a control unit, and the at least one valve takes an open position when a control signal is missing, so that an open fluid connection is formed between the piston side of a piston and a reservoir for hydraulic oil or an open fluid connection is formed between the piston-rod side of the piston and the reservoir.

2. The bridle block according to claim 1, wherein the piston is positioned all the way into the housing of the hydraulic cylinder when the at least one valve is open.

3. The bridle block according to claim 1, wherein the piston is positioned all the way out in the housing of the hydraulic cylinder when the at least one valve is open.

4. The bridle block according to claim 1, wherein the hydraulic cylinder is provided with two valves.

5. The bridle block according to claim 4, wherein the piston is positioned all the way into the housing of the hydraulic cylinder when both valves are open.

6. The bridle block according to claim 4, wherein the piston is positioned all the way out in the housing of the hydraulic cylinder when both valves are open.

7. The bridle block according to claim 1, wherein the reservoir for the hydraulic oil, a hydraulic pump and a motor for the hydraulic pump are positioned on the bridle block.

8. The bridle block according to claim 1, wherein the rocker arm has an inward portion for the attachment of the hydraulic cylinder.

9. The bridle block according to claim 1, wherein the position of the piston is controlled via remote control.

10. A method of passively guiding a deflector into a known angle of attack relative to water when the deflector is being towed through the water, wherein the deflector is attached to a bridle block with fore bridle lines and aft bridle lines, wherein the bridle block comprises a bridle block comprising a stem and a rocker arm pivotably attached to each other on a pivot axis, the stem having an attachment for a towline from a vessel, a forward portion of the rocker arm having an attachment for fore bridle lines of the deflector, and an aft portion of the rocker arm having an attachment for aft bridle lines of the deflector, and the bridle block having a hydraulic cylinder provided with at least one valve, and the hydraulic cylinder being attached to the stem and the rocker arm to hold the stem and the rocker arm in a chosen relative position, wherein the at least one valve is operated directly or indirectly by an electric control signal from a control unit, and the at least one valve takes an open position when a control signal is missing, so that an open fluid connection is formed between the piston side of a piston and a reservoir for hydraulic oil or an open fluid connection is formed between the piston-rod side of the piston and the reservoir, and wherein direct or indirect electric control signals from the control unit to the at least one valve cease.

11. The method according to claim 10, wherein the electric control signal from the control unit ceases when electrical energy from an electric power unit ceases.

12. The method according to claim 10, wherein the electric control signal from the control unit ceases when the control unit does not have communication with a vessel.

13. The method according to claim 10, wherein the electric control signal from the control unit ceases when a pressure sensor for the hydraulic oil registers that the pressure in the hydraulic oil is lower than a predetermined value.

14. The method according to claim 10, wherein the electric control signal from the control unit ceases when the control unit receives a signal from a vessel to let the direct or indirect electric signal to the at least one valve cease.

* * * * *